(12) United States Patent
Goss et al.

(10) Patent No.: US 10,089,170 B1
(45) Date of Patent: Oct. 2, 2018

(54) OPEN BLOCK MANAGEMENT

(71) Applicant: Seagate Technology LLC, Cupertino, CA (US)

(72) Inventors: Ryan James Goss, Prior Lake, MN (US); Antoine Khoueir, Edina, MN (US); Ara Patapoutian, Hopkinton, MA (US)

(73) Assignee: Seagate Technology LLC, Cupertino, CA (US)

( * ) Notice: Subject to any disclaimer, the term of this patent is extended or adjusted under 35 U.S.C. 154(b) by 162 days.

(21) Appl. No.: 15/183,710

(22) Filed: Jun. 15, 2016

(51) Int. Cl.
*G06F 11/07* (2006.01)

(52) U.S. Cl.
CPC ...... *G06F 11/0793* (2013.01); *G06F 11/0727* (2013.01); *G06F 11/0754* (2013.01)

(58) Field of Classification Search
CPC ............... G06F 3/0619; G06F 11/0727; G06F 11/0754; G06F 11/076; G06F 11/079; G06F 11/0793
See application file for complete search history.

(56) References Cited

U.S. PATENT DOCUMENTS

| | | | |
|---|---|---|---|
| 8,510,595 B2 | 8/2013 | Walls et al. | |
| 8,526,245 B2 | 9/2013 | Yoon et al. | |
| 8,909,986 B2 | 12/2014 | Huang et al. | |
| 8,914,670 B2 | 12/2014 | Zaltsman et al. | |
| 9,032,271 B2 | 5/2015 | Sun et al. | |
| 9,530,517 B2 * | 12/2016 | Lee | G11C 11/5635 |
| 9,858,002 B1 * | 1/2018 | Goss | G06F 3/0619 |
| 2013/0054880 A1 | 2/2013 | Chang et al. | |
| 2015/0100851 A1 | 4/2015 | Bhalerao et al. | |
| 2016/0019142 A1 | 1/2016 | Lin et al. | |
| 2016/0110114 A1 | 4/2016 | Moon | |
| 2016/0110249 A1 | 4/2016 | Orme | |

* cited by examiner

*Primary Examiner* — Joseph R Kudirka
(74) *Attorney, Agent, or Firm* — Cesari & Reed, LLP; Kirk A. Cesari (57) ABSTRACT

Systems and methods are disclosed for open block management. In certain embodiments, an apparatus may comprise a circuit configured to determine an error sensitivity of a last-written page of a block of a solid state memory that is in an open state where the block has not been fully filled with data. The error sensitivity may include a value that represents a susceptibility to developing data errors while in the open state. The circuit may perform a first error mitigation procedure when the error sensitivity is lower than a first threshold, include increasing an open block timeout period applied to the last-written page. The circuit may perform a second error mitigation procedure when the error sensitivity is higher than the first threshold, including copying data from the block to a new location when a first open block timeout is reached.

18 Claims, 5 Drawing Sheets

OPEN BLOCK MANAGEMENT

SUMMARY

In certain embodiments, an apparatus may comprise a circuit configured to determine an error sensitivity of a last-written page of a block of a solid state memory that is in an open state, where the block has not been fully filled with data. The error sensitivity may include a value that represents a susceptibility to developing data errors while in the open state. The circuit may perform a first error mitigation procedure when the error sensitivity is lower than a first threshold, and perform a second error mitigation procedure when the error sensitivity is higher than the first threshold.

In certain embodiments, a method may comprise determining an error sensitivity of a last-written page of a block of a solid state memory that is in an open state where the block has not been fully filled with data. The error sensitivity may include a value that represents a susceptibility to developing data errors while in the open state. The method may include performing a first error mitigation procedure when the error sensitivity is lower than a first threshold, and performing a second error mitigation procedure when the error sensitivity is higher than the first threshold.

In certain embodiments, an apparatus may comprise a solid state memory configured to store data to a plurality of blocks, each block including a plurality of pages. The apparatus may also comprise a circuit configured to determine an error sensitivity of a last-written page of a block of the solid state memory that is in an open state where the block has not been fully filled with data. The error sensitivity may include a value that represents a susceptibility to developing data errors while in the open state. The circuit may further perform a first error mitigation procedure when the error sensitivity is lower than a first threshold, and perform a second error mitigation procedure when the error sensitivity is higher than the first threshold.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that, when executed, cause a processor to perform the methods.

Figure 1:
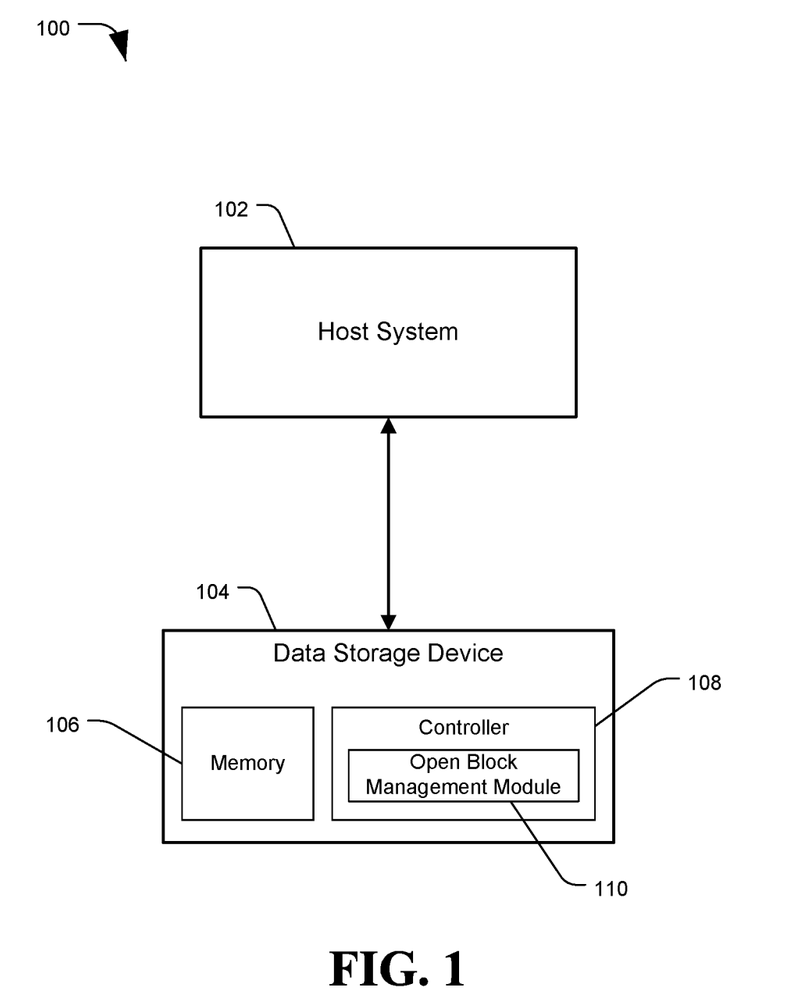
FIG. 1 is a diagram of a system configured to perform open block management, in accordance with certain embodiments of the present disclosure.

FIG. 1 is a diagram of a system configured to perform open block management, generally designated 100, in accordance with certain embodiments of the present disclosure. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data, such as a solid state drive (SSD). The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The DSD 104 may receive a data access request, such as a read or write request, from the host device 102. In response, the DSD 104 may use the controller 108 to perform data access operations on the memory 106 based on the request. The controller 108 may comprise a circuit or processor configured to control operations of the data storage device 104, such as the methods and functions described herein, as well as storing data to or retrieving data from the memory 106. The memory 106 may comprise one or more data storage mediums, such as nonvolatile solid state memories such as Flash memory, magnetic storage media such as disc drives, other types of memory, or a combination thereof.

Some memories 106, such as NAND Flash memory, may include a plurality of storage locations referred to as "blocks," and each block may include a plurality of smaller storage locations referred to as "pages." Some solid state memories are not randomly writable in that data cannot be overwritten or updated, and instead the storage locations must be erased or reset prior to being written with new data. Data may be written (or "programmed") at the page level, but the erasing process may be limited to the block level.

Blocks in a memory may be written a page at a time, for example by starting at a first page and continuing one page at a time until all pages have been written. When some data has been written to a block but not all pages of the block have been filled, the block may be considered to be in an "open" state. Similarly, one or more most recently written pages of a block may be considered "open" pages. If left in an open state for a prolonged period of time, data in an open block may have a chance of developing errors and becoming less reliable. In order to avoid loss of data, the DSD 104 may be configured to perform open block management operations.

DSD 104 may include an open block management module (OBMM) 110. A "module" may include one or more physical components of a computing device (e.g., circuits, processors, etc.), may include instructions that, when executed, can cause a processor to perform a particular task or job, or any combination thereof. A module may be configured to perform a particular task or job. The OBMM 110 may perform the methods and processes described herein to monitor open blocks and perform operations to prevent data loss at open blocks. A more detailed example embodiment of a DSD 104 is described in regards to FIG. 2.

Figure 2:
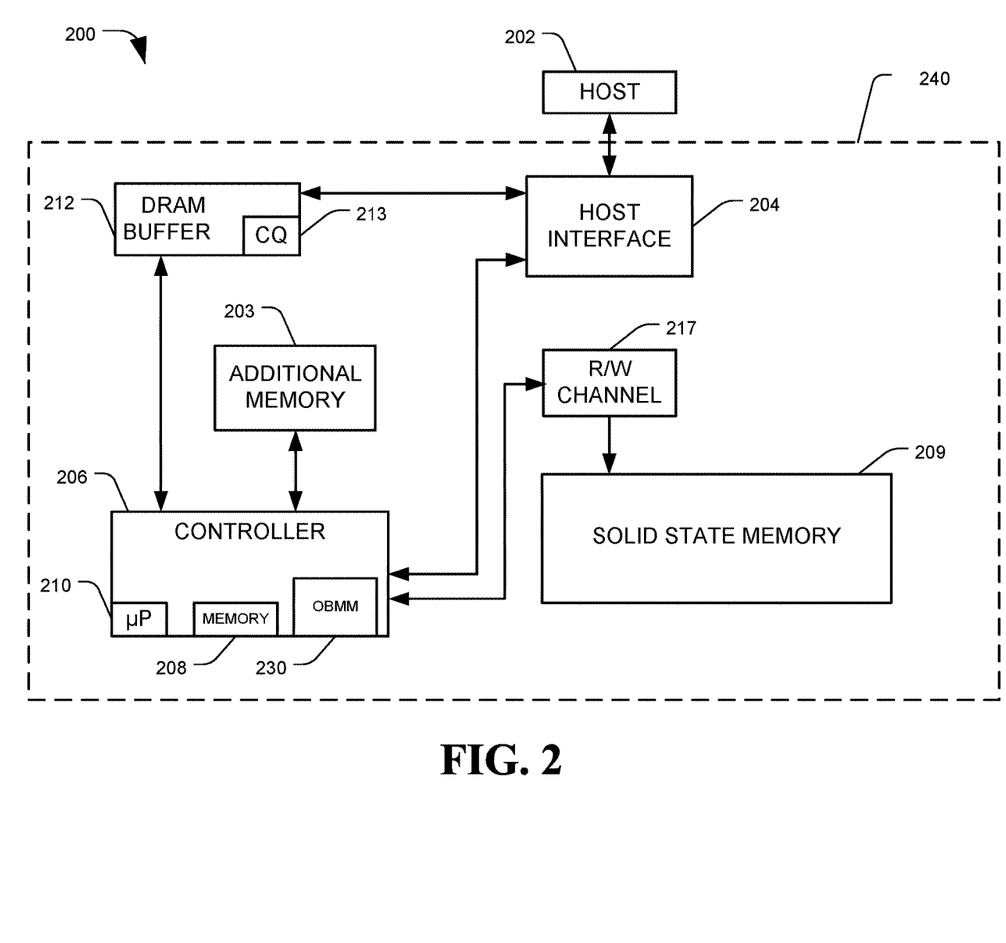
FIG. 2 is a diagram of a system configured to perform open block management, in accordance with certain embodiments of the present disclosure.

FIG. 2 is a diagram of a system 200 configured to perform open block management, in accordance with certain embodiments of the present disclosure. Specifically, FIG. 2 provides a functional block diagram of an example data storage device (DSD) 200. The DSD 200 can communicate with a host device 202 (such as the host system 102 shown in FIG. 1) via a hardware or firmware-based interface circuit 204. The interface 204 may comprise any interface that allows either wired or wireless communication between a host 202 and a DSD 200, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. The DSD 200 may have a casing 240 or housing containing the components of the DSD 200, or the components of the DSD 200 may be attached to the housing.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. The DSD 200 can include a read-write (R/W) channel 217, which can encode data during write operations and reconstruct user data retrieved from a memory, such as solid state memory 209, during read operations. Solid state memory 209 may include nonvolatile memory, such as NAND Flash memory.

The DSD 200 may include an additional memory 203 instead of or in addition to solid state memory 209. Additional memory 203 can be either volatile memory such as DRAM or SRAM, non-volatile memory such as magnetic disc(s) or additional nonvolatile solid state memory, or any combination thereof. The additional memory 203 can function as a cache and store recently or frequently read or written data, or data likely to be read soon. Additional memory 203 may also function as main storage instead of or in addition to solid state memory 209. A DSD 200 containing multiple types of nonvolatile storage mediums, such as a disc and Flash, may be referred to as a hybrid storage device.

DSD 200 may include an open block management module (OBMM) 230. The OBMM 110 may perform the methods and processes described herein to monitor open blocks and perform operations to prevent data loss at open blocks. For example, the OBMM 230 may monitor open blocks at solid state memory 209, perform evaluations of the blocks, and then perform reliability enhancing actions to prevent data loss. The OBMM 230 may be part of or execute by the controller 206, may be a separate component or circuit, may be incorporated into other components of the DSD 200, or any combination thereof. Additional details on the solid state memory 209 and OBMM 230 are discussed in regard to FIG. 3.

Figure 3:
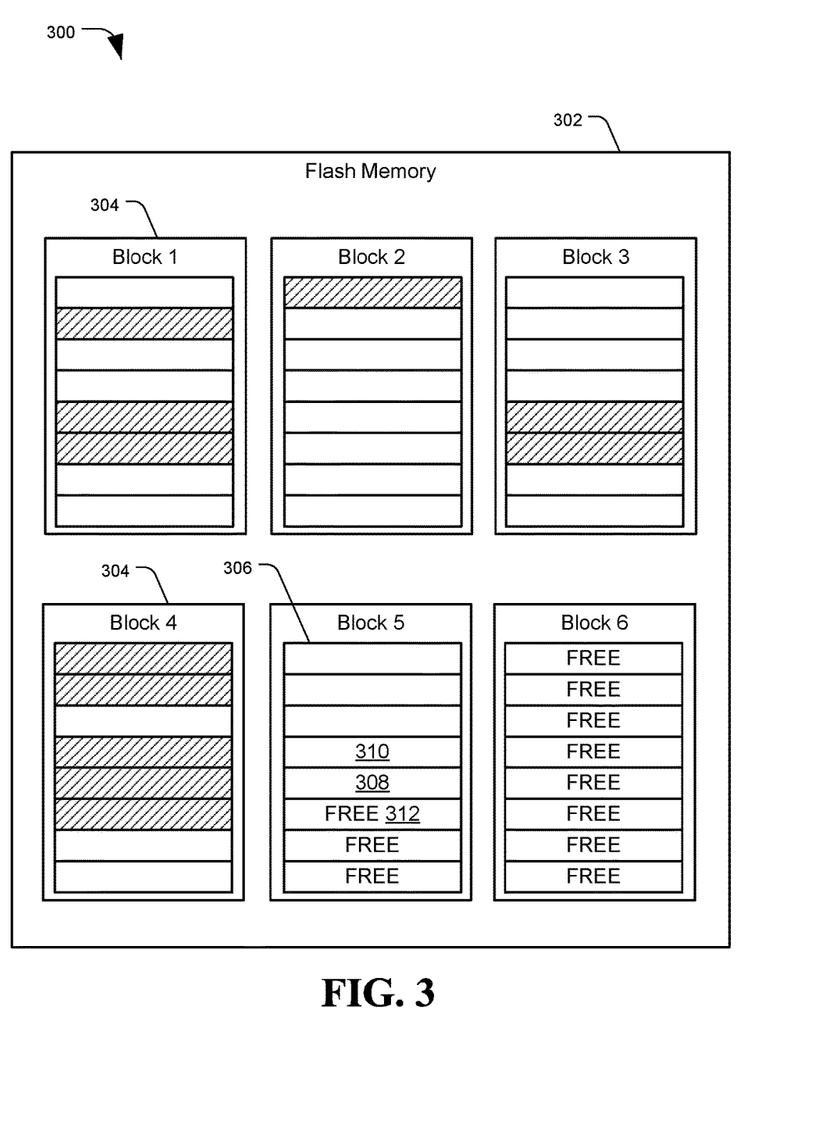
FIG. 3 is a diagram of a system configured to perform open block management, in accordance with certain embodiments of the present disclosure.

FIG. 3 is a diagram of a system 300 configured to perform open block management, in accordance with certain embodiments of the present disclosure. System 300 may include a NAND Flash memory 302, although other types of solid state memory are also possible. Flash memory 302 may include a plurality of blocks 304, each of which may include a plurality of writable pages 306 for storing data. Data may be written to Flash memory 302 in page-sized data segments. For example, each page 306 may store 8 KiB (kibibyte) of data, and a block 304 may contain 64 pages, or 128 pages. A portion of each page may be devoted to error correction code (ECC) checksum values or other error correction or parity data. The size of pages and blocks, and the number of pages per block may be different depending on the device. Pages containing invalid data (e.g. no longer valid due to a more recent copy of the data being stored elsewhere) are indicated in FIG. 3 by hashed lines. Pages that have not yet been written are indicated as "free."

As stated, data may be written to Flash memory 302 one page 306 at a time, but already written data may not be overwritten with new data. If data stored in a specific page 306 is updated (e.g. a newer version is written to a new location), the data for that page becomes invalid. Once all the pages 306 in a block 304 have been filled with valid or invalid data, a garbage collection process may be performed to recapture that space and allow new data to be written to the block 304. In garbage collection, all valid data is read from a block 304 and written to new pages 306 in other blocks 304. Once all valid data has been removed from a block 304, the entire block 304 may be erased and made available for new data. Data may be written one page at a time, but only an entire block may be erased at a time.

For example, Block 4 may be selected for garbage collection, because it has the most invalid pages. The three valid pages may be read, and may be copied to the three free pages of Block 5. Block 4 may therefore no longer have any valid data, and all pages 306 in Block 4 may be erased and made free for new data.

When only a portion of the pages 306 of a block 304 have been written, as shown in Block 5, that block may be considered to be in an open state. Once all pages 306 of a block 304 have been written with data (whether valid or invalid), the block 306 may be put in a closed state, as with Block 1 through Block 4. Closing a block 306 may include refining and stabilizing threshold voltage values. When a block has not been closed, coupling effects between written pages and unwritten free pages may result in a degradation of data quality in pages of the open block. Remaining in an open state for a prolonged period may lead to data corruption and errors in the stored data, and eventually may result in unrecoverable data.

As used herein, an open page may be a last-written page in an open block. Similarly, reference may be made to open word lines, with word lines and bit lines being used to store data to certain solid state memories. As used herein, discussion of open pages may be applied to open word lines as well. As an example of an open page, page 308 may be the last-written page of Block 5, and adjacent to a first free page 312. Open pages 308 and other pages 310 close to free pages may be most susceptible to data errors from being in an open block. For example, the closer a page 306 is to an unwritten free page 312, the more likely the page 306 is to experience data quality degradation.

In order to prevent data degradation or loss at open blocks 304 and pages 306, an open block management module (OBMM) may perform operations to monitor and manage open blocks and pages. The OBMIVI may be configured to monitor an amount of time blocks remain in an open state, performing data maintenance of data in open blocks, and other operations as disclosed herein. An example method of performing open block management operations is described in regard to FIG. 4.

Figure 4:
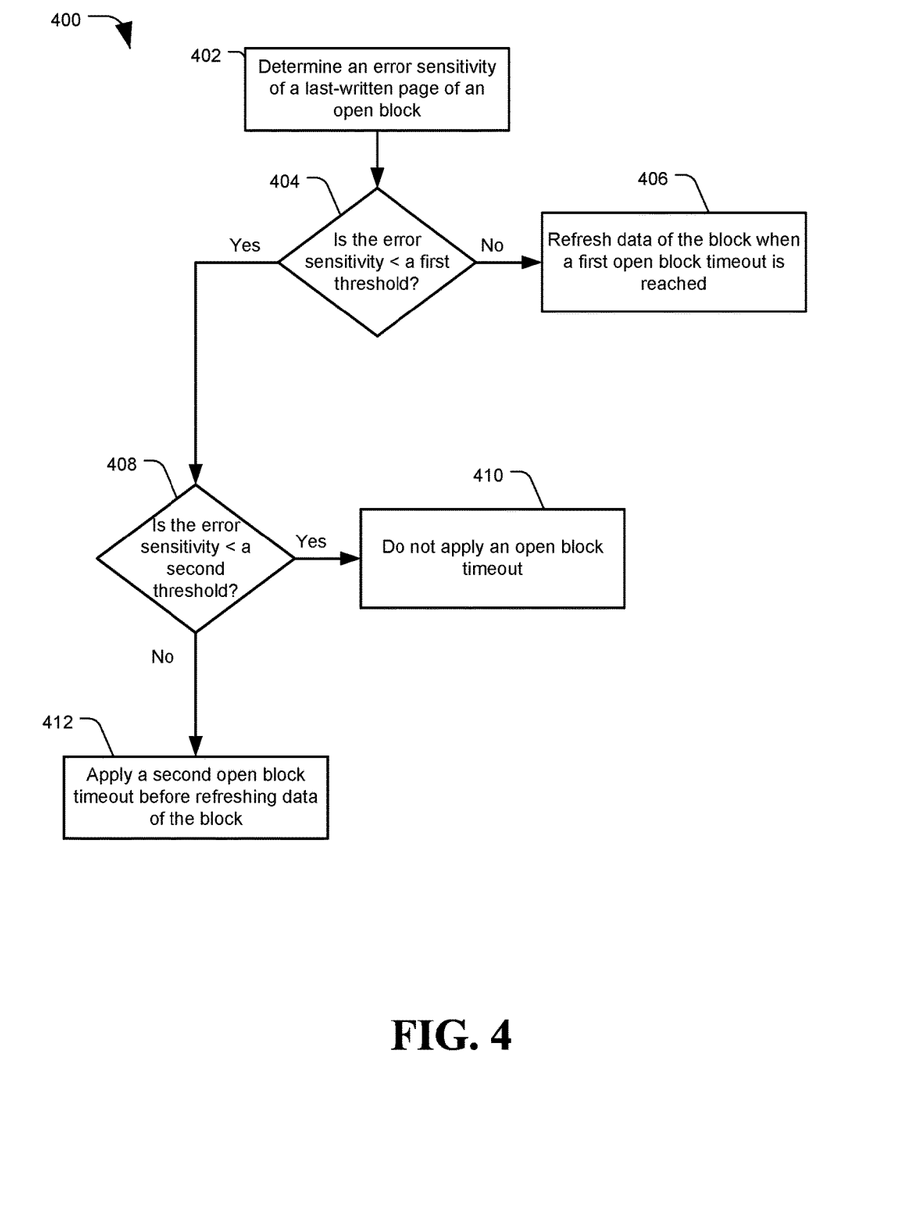
FIG. 4 is a flowchart of a method of open block management, in accordance with certain embodiments of the present disclosure.

FIG. 4 is a flowchart of an example method 400 of open block management, in accordance with certain embodiments of the present disclosure. The method 400 may be performed by an open block management module (OBMM) as described herein.

Blocks may remain reliable for a certain period of time while in an open state. In order to mitigate data loss due to open blocks, the OBMIVI may compare an amount of time that a block has been in an open state against an open block timeout period, or open block time threshold. The open block timeout may be a time period that can indicate when data may become less reliable in an open block. The open block timeout may be an amount of time a block is allowed to remain in an open state before action is taken to prevent data loss. The time threshold may be set by a manufacturer of a data storage device (DSD) or the OBMM, for example based on reliability testing performed on similar memories. The time threshold may also be varied by the OBMM, for example based on a measured temperature or other conditions.

When a selected block has reached the open block timeout, the OBMM may perform operations to prevent data loss and enhance reliability. For example, the OBMM may simply refresh the data in the selected block when the time threshold is reached, by reading data from the selected block, correcting any data errors that have been detected, and copying the data to a new location. The data may be programmed to a new block, or back into free pages of the selected block. The newly written data will not include any degradation yet, and if the target block is still open, a new open block time threshold may be monitored for the data. In this manner, the data that was read from the selected block during the refresh becomes invalid data, because a newer version of the data is recorded elsewhere. Loss of the invalid data is no longer a concern.

However, it may be inefficient to apply a universal timeout period. Different pages may exhibit different sensitivity to data degradation while in an open state, or error sensitivity. This variance in sensitivity may be due to different physical characteristics of the physical structure of the page, the construction of the solid state memory, wear on the pages, or other factors. Because solid state memory cells may have a limited lifespan in how many program/erase (PE) cycles the cells can endure, it may improve device reliability to only perform data refreshes when those refreshes are necessary to preserve data integrity. Additionally, performing data refreshes requires operational overhead, so reducing the required number of data refreshes may reduce performance variability in a DSD's responsiveness.

Accordingly, the method 400 may include determining an error sensitivity of one or more selected last-written pages of an open block, at 402. The last written page may correspond to page 308 of FIG. 3. As described above, the last-written (e.g. most recently written) pages in an open block, those pages which are adjacent or most closely proximate to unwritten pages of the block, are the pages most exposed to the conditions causing open block data degradation. An OBMM may therefore determine an error sensitivity value of one or more last-written pages of an open block in order to gauge the probability of error degradation due to those pages being exposed to the open block conditions. The OBMM may be able to determine a last-written page, and then access a stored table or otherwise obtain a sensitivity value for the last-written page.

Error sensitivity of pages may be determined in various ways. For example, a manufacturer could perform testing on a class of solid state memories to determine open page error susceptibility, and store pre-determined values for the various pages to a memory accessible to the OBMM. In some embodiments, error sensitivity values may be determined or updates during operation of the DSD. For example, each page may initially be presumed to have a default sensitivity. When an open block timeout is reached and the data stored to a last-written page is to be refreshed, the OBMM may determine a number of data errors encountered at the page. If the number of errors is higher than a first threshold, the error sensitivity value for the page may be increased. If the number of errors is lower than a second threshold, the error sensitivity value for the page may be decreased. Other embodiments are also possible.

Determination of the error sensitivity may be performed at different points in time, depending on the implementation. For example, the sensitivity of a selected open page may be determined after the page programming operation completes, and when there are no other pending write operations pending for pages following the selected page. The determined sensitivity may then be used to select an open block timeout period for the selected page. In another embodiment, the sensitivity may be determined when a first open block timeout is reached, such as a shortest default timeout period for the DSD. The timeout period may then be extended based on the determined sensitivity. Other embodiments are also possible.

After determining the error sensitivity at 402, the method 400 may include determining whether the error sensitivity of the selected block is less than a first error sensitivity threshold, at 404. Having a lower error sensitivity than the threshold may mean that the selected page is resistant to data degradation while in an open state, and may not need to be refreshed. If the determined error sensitivity is not less than the first threshold, the method 400 may include refreshing data from the selected block when a first open block timeout is reached, at 406. If the error sensitivity was determined when the selected page was written, then the first open block timeout counter may be set, and data from the block may be refreshed if additional data is not written to the block before the timeout period expires. If the error sensitivity is determined when the first open block timeout is reached, then the data may be refreshed upon the determination that the sensitivity is not below the first threshold.

If the determined error sensitivity is lower than the first threshold at 404, the method 400 may include applying a longer open block timeout than the first open block timeout from 406. The open block timeout may even be removed if the selected page is highly resistant to open block data degradation. In some embodiments, multiple error sensitivity thresholds may be applied to determine how to manage the open block. For example, at 408 the determined error sensitivity may be compared against a second error sensitivity threshold, at 408. If the error sensitivity is lower than the second threshold, the OBMM may determine that the selected open page is extremely resistant to data degradation, and may determine not apply an open block timeout for the selected page. The OBMM may essentially treat the open block in the same manner as a closed block, and not monitor a time period at which to refresh the data.

If the determined error sensitivity is not lower than the second threshold, at 408, the method 400 may determine that the selected page may still exhibit enough data degradation to warrant a data refresh after a long enough period. The method 400 may include applying a second open block timeout, longer than the first open block timeout, before refreshing data from the block, at 412. For example, if the first open block timeout period is 12 hours, the second open block timeout period may be 24 hours. Additional error sensitivity thresholds may also be applied, with longer error timeout periods applying for each sensitivity threshold.

Although the method 400 is described regarding a selected open page, the same principles may be applied to a plurality of most recently written pages in a block, which may be some number of pages less than all the pages in a block. For example, the last N pages of a block may be evaluated for error sensitivity, with page N being closest to an unwritten page, and page 1 being farthest. Other arrangements are also possible, for example based on the configuration of the memory (e.g. multi-level cell MLC or single-level cell SLC memories). Although page N may have the strongest exposure to error causing influences, physically proximate pages may also be influenced. So even if page N has very low error sensitivity and is resistant to data degradation, page N−1 may have high error sensitivity.

When determining error sensitivity for a group of pages, the OBMM may handle the sensitivities in various ways. For example, the OBMM may add or average the sensitivities of the N last-written pages from the block. The OBMM apply weighting factors based on the proximity of the page to unwritten pages. For example, page N may be evaluated based on 100% of its error sensitivity value, while page N−1 may be evaluated based on 50% of its error sensitivity value. The weighting may lower the determined error sensitivity for a page to reflect the page's distance from the influence of unwritten pages and the associated error producing forces. In an example, the weighting may be applied based on [page error sensitivity value]*(1/[pages from unwritten page]). So the last written page, page N, may be evaluated based on [page N sensitivity]*(1/1), while page N−1 may be evaluated based on [page N−1 sensitivity]*(1/2), and for page N−2, [page N−2 sensitivity]*(1/3), etc. The OBMM may then determine what open block timeout to apply based on the highest determined error sensitivity out of the plurality of selected pages. As an example, assume page N has a base error sensitivity value of 2, while page N−1 has a base error sensitivity value of 6, indicating page N−1 is more prone to open page errors than page N. Based on weighting, page N's error sensitivity may be 2*(1/1)=2, while page N−1's error sensitivity may be 6*(1/2)=3. If the first error sensitivity threshold applied at 404 is 3, then the first open block timeout may be applied, even though page N has a lower error sensitivity than 3. The provided examples are merely illustrative, and other embodiments and implementations may also be applied.

Figure 5:
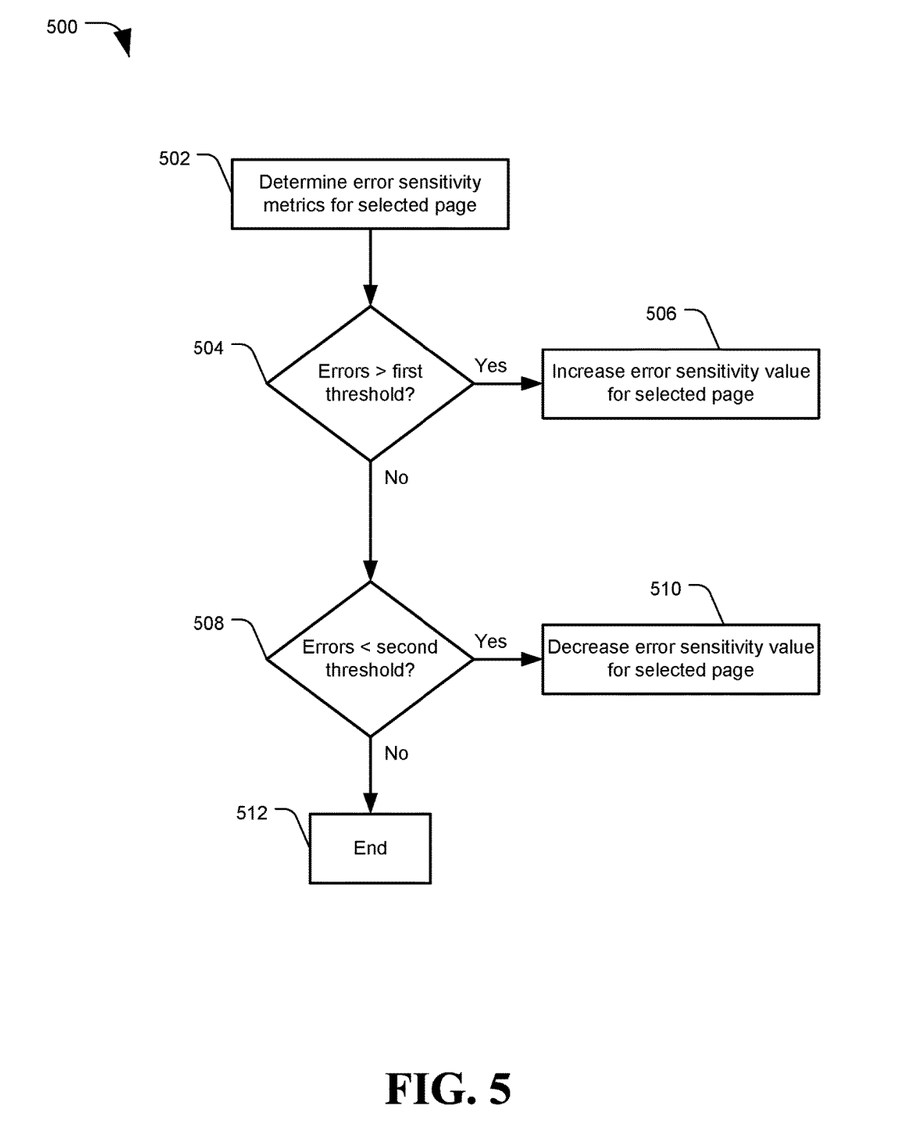
FIG. 5 is a flowchart of a method of open block management, in accordance with certain embodiments of the present disclosure.

Turning now to FIG. 5, a flowchart of an example method 500 of open block management is shown, in accordance with certain embodiments of the present disclosure. In particular, method 500 depicts an example method of adjusting error sensitivity values for pages of a solid state memory. Error sensitivity values may change over time, for example based on wear of the memory. The method 500 may be performed by an open block management module (OBMM) as described herein.

The method 500 may include determining error sensitivity metrics for a selected page, at 502. Error sensitivity metrics may include information that indicates how unreliable or degraded data has become at the selected page while the page was in an open state. For example, data may be read from the selected page, and a bit error rate (BER) may be determined from the read data. In some embodiments, error sensitivity metrics may include a number of errors encountered, a number of read retry attempts required to read the data, how many steps of a data recovery process were required (e.g. read retries, adjusting access voltages, etc.), or any other metric that may indicate susceptibility to open block data errors. The error sensitivity metrics may be obtained at points or intervals that allow the OBMM to determine an amount of degradation over a set period of time. For example, error metrics may be obtained when the selected page is refreshed due to an open block timeout expiring for the block, or after a set time period prior to an open block timeout expiring.

The method 500 may include determining whether the obtained error sensitivity metrics are higher than a first sensitivity adjustment threshold value, at 504. The sensitivity adjustment threshold used may be based on the page's current error sensitivity value. Error metrics higher than the threshold may indicate that the page is more sensitive to open block errors than its current sensitivity value would indicate. If error sensitivity metrics are higher than the threshold, the method 500 may include increasing the error sensitivity value for the selected page, at 506. Increasing the error sensitivity value for the page may result in shorter open block timeout periods being applied for the selected page in order to prevent loss of data.

If the determined error sensitivity metrics are not higher than the first threshold, at 504, the method 500 may include determining whether the error sensitivity metrics are lower than a second sensitivity adjustment threshold, at 508. The second threshold may be lower than the first threshold, and may be used to gauge whether the selected page is more resistant to open block errors than its current error sensitivity value would indicate. If the metrics are lower than the second threshold, the method 500 may include decreasing the error sensitivity value for the selected page, at 510. Decreasing the error sensitivity may result in longer open block timeout periods being applied for the selected page.

If the error metrics were lower than the first threshold, at 504, but higher than the second threshold, at 508, it may indicate that the observed error metrics are within an expected range for an open page having the selected page's current error sensitivity value. Accordingly, no adjustment to the selected page's error sensitivity value may be applied, and the method 500 may end, at 512.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to:
   determine an error sensitivity of a last-written page of a block of a solid state memory that is in an open state where the block has not been fully filled with data, the error sensitivity including a value that represents a susceptibility to developing data errors while in the open state;
   perform a first error mitigation procedure when the error sensitivity is lower than a first threshold; and
   perform a second error mitigation procedure when the error sensitivity is higher than the first threshold, the second error mitigation procedure includes:
   reading data from the block when a first open block timeout is reached, the first open block timeout including a duration of time the last-written page is allowed to remain in an open state before data of the block is refreshed; and
   copying the data to a new storage location of the solid state memory.

2. The apparatus of claim 1 further comprising:
   the first error mitigation procedure includes increasing an open block timeout period applied to the last-written page.

3. The apparatus of claim 2 further comprising:
   increasing the open block timeout period includes:
   determining whether the error sensitivity of the last-written page is lower than a second threshold; and
   applying a second open block timeout longer than the first open block timeout when the error sensitivity is not lower than the second threshold.

4. The apparatus of claim 3 further comprising:
   increasing the open block timeout period further includes not applying the open block timeout when the error sensitivity is lower than the second threshold, including not refreshing data from the block based on the block remaining in the open state.

5. The apparatus of claim 4 comprising the circuit further configured to:
   determine error sensitivity metrics for the last-written page based on errors encountered when reading data from the last-written page;
   increase a value of the error sensitivity when the error sensitivity metrics are higher than a first sensitivity adjustment threshold; and
   decrease the value of the error sensitivity when the error sensitivity metrics are lower than a second sensitivity adjustment threshold.

6. The apparatus of claim 5 comprising the circuit further configured to:
   determine error sensitivity of a plurality of most-recently written pages, including the last-written page, the plurality of most-recently written pages being less than all pages in the block; and
   determine which of the first error mitigation procedure and the second error mitigation procedure to perform based on comparing the error sensitivity of the plurality of most-recently written pages to the first threshold.

7. A method comprising:
   determining an error sensitivity of a last-written page of a block of a solid state memory that is in an open state where the block has not been fully filled with data, the error sensitivity including a value that represents a susceptibility to developing data errors while in the open state;
   performing reliability enhancing operations to prevent data loss based on the error sensitivity of the last-written page, including:
   performing a first error mitigation procedure when the error sensitivity is lower than a first threshold, the first error mitigation procedure includes increasing an open block timeout period applied to the last-written page, the open block timeout period including a duration of time the last-written page is allowed to remain in an open state before data of the block is refreshed; and
   performing a second error mitigation procedure when the error sensitivity is higher than the first threshold.

8. The method of claim 7 further comprising:
   the second error mitigation procedure includes:
   reading data from the block when the first open block timeout period is reached; and
   copying the data to a new storage location of the solid state memory.

9. The method of claim 7 further comprising:
   increasing the open block timeout period includes:
   determining whether the error sensitivity of the last-written page is lower than a second threshold; and
   applying a second open block timeout longer than the first open block timeout when the error sensitivity is not lower than the second threshold.

10. The method of claim 7 further comprising:
    increasing the open block timeout period includes:
    determining whether the error sensitivity of the last-written page is lower than a second threshold; and
    not applying the open block timeout when the error sensitivity is lower than the second threshold, including not refreshing data from the block based on the block remaining in the open state.

11. The method of claim 7 further comprising:
    determining error sensitivity metrics for the last-written page based on errors encountered when reading data from the last-written page;
    increasing a value of the error sensitivity when the error sensitivity metrics are higher than a first sensitivity adjustment threshold; and
    decreasing the value of the error sensitivity when the error sensitivity metrics are lower than a second sensitivity adjustment threshold.

12. The method of claim 7 further comprising:
    determining error sensitivity of a plurality of most-recently written pages, including the last-written page, the plurality of most-recently written pages being less than all pages in the block; and
    performing one of the first error mitigation procedure and the second error mitigation procedure based on comparing the error sensitivity of the plurality of most-recently written pages to the first threshold.

13. An apparatus comprising:
    a solid state memory configured to store data to a plurality of blocks, each block including a plurality of pages;
    a circuit configured to:
    determine an error sensitivity of a last-written page of a block of the solid state memory that is in an open state where the block has not been fully filled with data, the error sensitivity including a value that represents a susceptibility to developing data errors while in the open state;

perform a first error mitigation procedure when the error sensitivity is lower than a first threshold; and perform a second error mitigation procedure when the error sensitivity is higher than the first threshold.

14. The apparatus of claim 13 further comprising:

the second error mitigation procedure includes:

reading data from the block when a first open block timeout is reached, the first open block timeout including a duration of time the last-written page can is allowed to remain in an open state before data of the block is refreshed; and copying the data to a new storage location of the solid state memory.

15. The apparatus of claim 13 further comprising:

the first error mitigation procedure includes increasing an open block timeout period applied to the last-written page, the open block timeout period including a duration of time the last-written page is allowed to remain in an open state before data of the block is refreshed.

16. The apparatus of claim 15 further comprising:

increasing the open block timeout period includes:

determining whether the error sensitivity of the last-written page is lower than a second threshold;

applying a second open block timeout longer than the first open block timeout when the error sensitivity is not lower than the second threshold; and not applying the open block timeout when the error sensitivity is lower than the second threshold, including not refreshing data from the block based on the block remaining in the open state.

17. The apparatus of claim 13 comprising the circuit further configured to:

determine error sensitivity metrics for the last-written page based on errors encountered when reading data from the last-written page;

increase a value of the error sensitivity when the error sensitivity metrics are higher than a first sensitivity adjustment threshold; and decrease the value of the error sensitivity when the error sensitivity metrics are lower than a second sensitivity adjustment threshold.

18. The apparatus of claim 13 comprising the circuit further configured to:

determine error sensitivity of a plurality of most-recently written pages, including the last-written page, the plurality of most-recently written pages being less than all pages in the block; and perform one of the first error mitigation procedure and the second error mitigation procedure based on comparing the error sensitivity of the plurality of most-recently written pages to the first threshold.

* * * * *